(12) United States Patent
Cai

(10) Patent No.: US 8,755,400 B2
(45) Date of Patent: *Jun. 17, 2014

(54) MULTICAST BROADCAST SINGLE FREQUENCY NETWORK DATA SCHEDULING AND HANDLING

(75) Inventor: Zhijun Cai, Euless, TX (US)

(73) Assignee: BlackBerry Limited, Waterloo, Ontario (CA)

(*) Notice: Subject to any disclaimer, the term of this patent is extended or adjusted under 35 U.S.C. 154(b) by 379 days.

This patent is subject to a terminal disclaimer.

(21) Appl. No.: 12/975,079

(22) Filed: Dec. 21, 2010

(65) Prior Publication Data

US 2011/0090917 A1  Apr. 21, 2011

Related U.S. Application Data

(62) Division of application No. 11/952,864, filed on Dec. 7, 2007.

(51) Int. Cl.
    *H04L 12/28* (2006.01)
    *H04W 4/00* (2009.01)
    *H04B 1/16* (2006.01)

(52) U.S. Cl.
     USPC ...... 370/431; 370/332; 455/343.3; 455/343.4

(58) Field of Classification Search
     USPC .................................................. 370/331, 431
     See application file for complete search history.

(56) References Cited

U.S. PATENT DOCUMENTS

| | | | | |
|---|---|---|---|---|
| 8,259,636 B2* | 9/2012 | Hus et al. | | 370/312 |
| 8,369,286 B2* | 2/2013 | Hamabe et al. | | 370/332 |
| 2002/0080816 A1* | 6/2002 | Spinar et al. | | 370/449 |
| 2004/0087320 A1* | 5/2004 | Kim et al. | | 455/458 |
| 2004/0103435 A1* | 5/2004 | Yi et al. | | 725/81 |
| 2004/0105102 A1 | 6/2004 | Tomomatsu | | |
| 2004/0105402 A1* | 6/2004 | Yi et al. | | 370/312 |
| 2005/0004970 A1* | 1/2005 | Jain et al. | | 709/200 |
| 2005/0190712 A1 | 9/2005 | Lee et al. | | |
| 2005/0255836 A1 | 11/2005 | Lee et al. | | |
| 2006/0067281 A1 | 3/2006 | Kwak et al. | | |

(Continued)

FOREIGN PATENT DOCUMENTS

| | | |
|---|---|---|
| CN | 1879326 A | 12/2006 |
| WO | 2005015784 A1 | 2/2005 |

(Continued)

OTHER PUBLICATIONS

Chinese Office Action; Application No. 200880119450.5; Sep. 24, 2012; 13 pages.

(Continued)

*Primary Examiner* — Guang Li
(74) *Attorney, Agent, or Firm* — Conley Rose, P.C.; Maria L. Sekul; J. Robert Brown, Jr.

(57) ABSTRACT

A system is provided for scheduling for a multicast broadcast single frequency network (MBSFN). The system includes a central control configured to promote a plurality of enhanced node Bs (ENBs) transmitting one or more multicast traffic channels (MTCHs). The one or more MTCHs are provided during a variable scheduling period (SP) and include a data portion that contains MBSFN traffic content and a variable scheduling portion that contains scheduling information related to the MBSFN traffic content.

5 Claims, 10 Drawing Sheets

(56) References Cited

U.S. PATENT DOCUMENTS

| | | | |
|---|---|---|---|
| 2006/0209870 A1 | 9/2006 | Lee et al. | |
| 2008/0025240 A1 | 1/2008 | Casaccia et al. | |
| 2009/0047942 A1* | 2/2009 | Cao | 455/422.1 |
| 2012/0087295 A1* | 4/2012 | Xu et al. | 370/312 |

FOREIGN PATENT DOCUMENTS

| | | | |
|---|---|---|---|
| WO | 2005078962 A1 | 8/2005 | |
| WO | 2006033521 A1 | 3/2006 | |
| WO | 2006118393 A2 | 11/2006 | |
| WO | 2006135201 A1 | 12/2006 | |

OTHER PUBLICATIONS

Final Office Action dated Nov. 15, 2012; 17 pages; U.S. Appl. No. 11/952,864, filed Dec. 7, 2007.
Cai, Zhijun; U.S. Appl. No. 11/952,864, filed Dec. 7, 2007; Multicast Broadcast Single Frequency Network Data Scheduling and Handling.
Cai, Zhijun; U.S. Appl. No. 11/953,771, filed Dec. 10, 2007; System and Method for Single Cell Point-to-Multipoint Multiplexing and Scheduling.
LG Electronics; "MTCH Discontinuous Transmission and Reception"; TSG-RA Working Group 2 #41; Malaga, Spain; Feb. 16-20, 2004; 7 pgs.
3GPP TS 25.346v7.3.0; 3rd Generation Partnership Project; Technical Specification Group Radio Access Network; Introduction of the Multimedia Broadcast Multicast Service (MBMS) in the Radio Access Network (RAN); Stage 2; (Release 7); Mar. 2007; 60 pgs.
3GPP TS 25.346v7.5.0; 3rd Generation Partnership Project; Technical Specification Group Radio Access Network; Introduction of the Multimedia Broadcast Multicast Service (MBMS) in the Radio Access Network (RAN); Stage 2 (Release 7); Sep. 2007; 64 pgs.
Office Action dated Mar. 2, 2011; 17 pages; U.S. Appl. No. 11/952,864, filed Dec. 7, 2007.
EP Search Report; EP Application No. 08100006.9; Feb. 18, 2008; 5 pgs.
EP Search and Examination Report; EP Application No. 08100006.9; Jul. 4, 2008, 14 pgs.
PCT International Search Report; PCT Application No. PCT/US2008/085695; Apr. 16, 2009; 4 pgs.
PCT Written Opinion of the International Searching Authority; PCT Application No. PCT/US2008/085695; Apr. 16, 2009; 6 pgs.
Final Office Action dated Aug. 25, 2011; 12 pages; U.S. Appl. No. 11/952,864, filed Dec. 7, 2007.
Korean Office Action; Application No. 10-2010-7013822; Sep. 27, 2011; 6 pages.
Mexican Office Action; Application No. MX/a/2010/006066; Aug. 3, 2011; 5 pages.
3GPP TSG-RAN WG RAN2-ON LTE; "aGW Based Centralized PRB Scheduling for MBMS in LTE SFN"; R2-061884; Cannes, France; Jun. 27-30, 2006; 5 pages.
3GPP TSG-RAN WG2 #59; "MCCH Scheduling and UE Duty Cycle"; R2-073442; Athens, Greece; Aug. 20-24, 2007; 3 pages.
3GPP TSG-RAN WG2 Meeting #60; "MSCH Transmission and Content"; R2-074845; Jeju, South Korea; Nov. 5-9, 2007; 4 pages.
3GPP TSG-RAN WG2 #58; "Service Scheduling for E-MBMS Combining"; R2-071651; Kobe, Japan; May 7-11, 2007; 8 pages.
Office Action dated May 24, 2012; 15 pages; U.S. Appl. No. 11/952,864, filed Dec. 7, 2007.
Canadian Office Action; Application No. 2,707,960; Apr. 18, 2012; 4 pages.
Japanese Office Action; Application No. 2010-537112; May 7, 2012; 7 pages.
Advisory Action dated Jan. 17, 2013; 5 pages; U.S. Appl. No. 11/952,864, filed Dec. 7, 2007.
3GPP TS 36.201 V9.1.0; 3rd Generation Partnership Project; Technical Specification Group Radio Access Network; Evolved Universal Terrestrial Radio Access (E-UTRA); LTE Physical Layer; General Description; Release 9; Mar. 2010; 13 pages.
Office Action dated May 30, 2013; 17 pages; U.S. Appl. No. 11/952,864, filed Dec. 7, 2007.
Canadian Office Action; Application No. 2,707,960; Jun. 5, 2013; 5 pages.
Chinese Office Action; Application No. 200880119450.5; Jul. 18, 2013; 11 pages.
Final Office Action dated Sep. 20, 2013; U.S. Appl. No. 11/952,864, filed Dec. 7, 2007; 14 pages.
Advisory Action dated Dec. 30, 2013; U.S. Appl. No. 11/952,864, filed Dec. 7, 2007; 5 pages.
Notice of Allowance dated Feb. 28, 2014; U.S. Appl. No. 11/952,864, filed Dec. 7, 2007; 6 pages.
EP Examination Report; Application No. 08100006.9; Jan. 15, 2014; 5 pages.
Chinese Office Action; Application No. 200880119450.5; Feb. 8, 2014; 9 pages.
Korean Office Action; Application No. 10-2011-7028135; Dec. 23, 2013; 5 pages.

* cited by examiner

MULTICAST BROADCAST SINGLE FREQUENCY NETWORK DATA SCHEDULING AND HANDLING

CROSS-REFERENCE TO RELATED APPLICATIONS

This is a divisional application of the prior filed and co-pending U.S. patent application Ser. No. 11/952,864 filed Dec. 7, 2007, by Zhijun Cai, entitled "Multicast Broadcast Single Frequency Network Data Scheduling And Handling" which is incorporated herein by reference as if reproduced in its entirety.

BACKGROUND

In traditional wireless telecommunications systems, transmission equipment in a base station transmits signals throughout a geographical region known as a cell. As technology has evolved, more advanced network access equipment has been introduced that can provide services that were not possible previously. This advanced network access equipment might include, for example, an enhanced node B (ENB) rather than a base station or other systems and devices that are more highly evolved than the equivalent equipment in a traditional wireless telecommunications system. Such advanced or next generation equipment may be referred to herein as long-term evolution (LTE) equipment. For LTE equipment, the region in which a wireless device can gain access to a telecommunications network might be referred to by a name other than "cell", such as "hot spot". As used herein, the term "cell" will be used to refer to any region in which a wireless device can gain access to a telecommunications network, regardless of whether the wireless device is a traditional cellular device, an LTE device, or some other device.

Devices that might be used by users in a telecommunications network can include both mobile terminals, such as mobile telephones, personal digital assistants, handheld computers, portable computers, laptop computers, tablet computers and similar devices, and fixed terminals such as residential gateways, televisions, set-top boxes and the like. Such devices will be referred to herein as user equipment or UE.

A group of LTE-based cells might be under the control of a single entity known as a central control. The central control typically manages and coordinates certain activities with a group of cells such as the scheduling of transmissions and the control of a modulation and coding scheme for the cells. The modulation and coding schemes might include binary phase-shift keying (BPSK), quadrature phase-shift keying (QPSK), quadrature amplitude modulation (QAM), or other schemes that will be familiar to one of skill in the art.

Services that might be provided by LTE-based equipment can include broadcasts or multicasts of television programs, streaming video, streaming audio, and other multimedia content. Such services are commonly referred to as multimedia broadcast multicast services (MBMS). An MBMS might be transmitted throughout a single cell or throughout several contiguous or overlapping cells. A set of cells receiving an MBMS can be referred to as a service area. A service area and a region under the control of a central control do not necessarily coincide. For example, a central control might specify that a first subset of cells under its control will deliver a first MBMS and that a second subset of cells under its control will deliver a second MBMS.

When multiple cells overlap, a UE within the overlapped region can receive transmissions from multiple ENBs. It is well known in the art that when a UE receives substantially identical data from a plurality of ENBs, the transmissions from the ENBs can augment one another to provide a signal of significantly higher quality than would be the case if only one ENB were transmitting the signal. That is, a higher signal-to-noise ratio can be achieved when substantially the same data is transmitted at substantially the same time on substantially the same resource with substantially the same modulation and coding. A region in which a plurality of substantially identical signals are present is known as a single frequency network, or SFN. In the case where all of the ENBs in a service area are transmitting an MBMS with substantially identical signals, the service area can be referred to a multicast/broadcast SFN (MBSFN).

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 2:
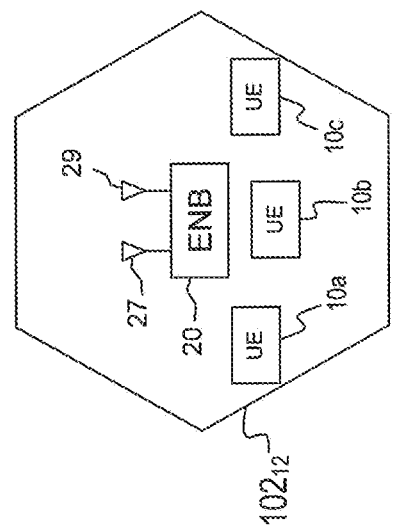
FIG. 2 is an illustration of a cell in a cellular network according to an embodiment of the disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In an embodiment, a system is provided for scheduling for a multicast broadcast single frequency network (MBSFN). The system includes a central control configured to promote a plurality of enhanced node Bs (ENBs) transmitting one or more multicast traffic channels (MTCHs). The one or more MTCHs are provided during a variable scheduling period (SP) and include a data portion that contains MBSFN traffic content and a variable scheduling portion that contains scheduling information related to the MBSFN traffic content.

In another embodiment, a method is disclosed for providing a plurality of multicast traffic channels (MTCHs). The method includes determining the plurality of MTCHs that belong to a single multicast broadcast single frequency network (MSBFN), and selecting a multiplexing scheme for the plurality of MTCHs. The method also includes mapping the plurality of MTCHs according to the multiplexing scheme to a single multicast transport channel (MCH) layer over a variable scheduling period (SP), wherein traffic from the plurality of MTCHs is allocated to a plurality of transport blocks (TBs) of the SP to reduce padding in vacant TBs.

In one embodiment, a network control entity in a wireless telecommunication network is provided for scheduling multimedia broadcast multicast services (MBMS). The network control entity includes a processor configured to promote transmitting an MTCH having a substantially constant service rate. The processor is further configured to promote a secondary multicast control channel (S-MCCH) providing scheduling information associated with the transmitted MTCH.

In still other embodiments, a user equipment is provided to receive a multicast broadcast single frequency network (MBSFN) traffic content. The user equipment includes a processor that is configured to receive one or more multicast traffic channels (MTCHs) transmissions provided during a variable scheduling period (SP) and including a data portion that contains MBSFN traffic content and a variable scheduling portion that contains scheduling information related to the MBSFN traffic content. The processor is further configured to use the scheduling information in the scheduling portion to receive one or more of the MTCHs.

In another embodiment, a user equipment is provided that includes a processor that is configured to receive a single multicast broadcast single frequency network (MSBFN) broadcast. The broadcast including a the plurality of MTCHs multiplexed to comprise the broadcast and mapped according to the multiplexing scheme to a single multicast transport channel (MCH) layer over a variable scheduling period (SP). Traffic from the plurality of MTCHs is allocated to a plurality of transport blocks (TBs) of the SP to reduce padding in vacant TBs. The processor is further configured to use a demultiplexing scheme related to the multiplexing scheme to analyze the scheduling period to receive one of the plurality of MTCHs.

Figure 1:
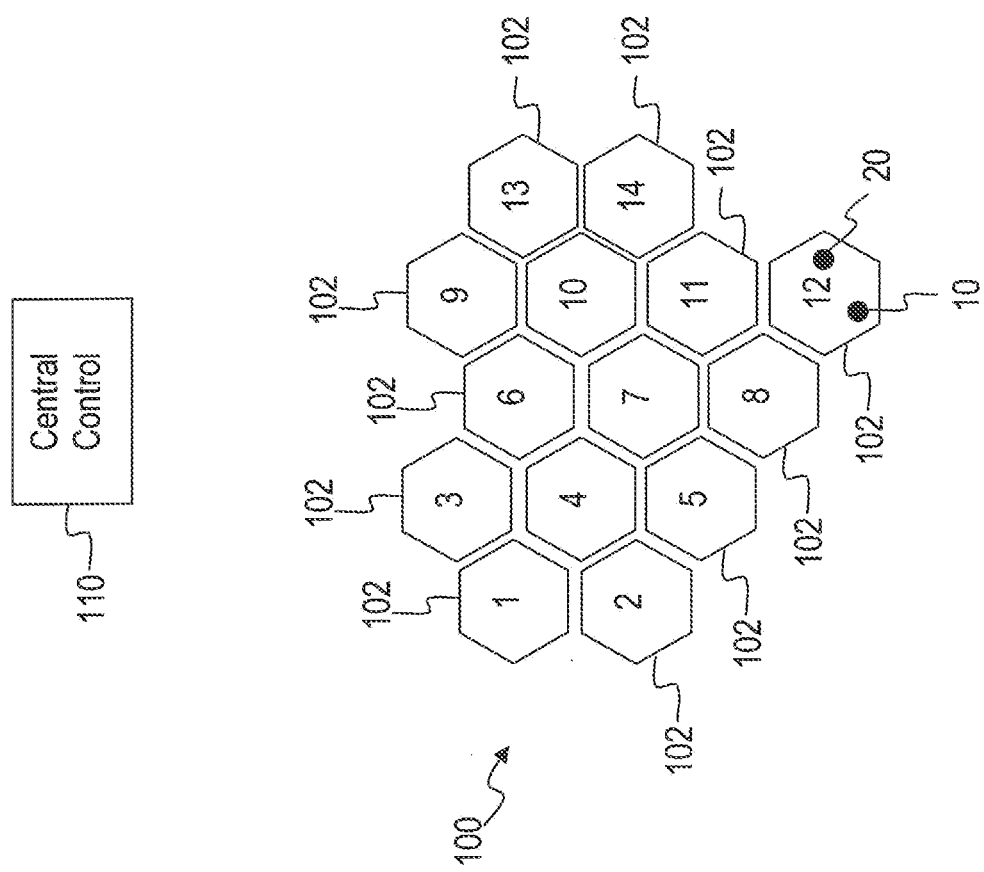
FIG. 1 is an illustration of a cellular network according to an embodiment of the disclosure.

FIG. 1 illustrates an exemplary cellular network 100 according to an embodiment of the disclosure. The cellular network 100 may include a plurality of cells $102_1$, $102_2$, $102_3$, $102_4$, $102_5$, $102_6$, $102_7$, $102_8$, $102_9$, $102_{10}$, $102_{11}$, $102_{12}$, $102_{13}$, and $102_{14}$ (collectively referred to as cells 102). As is apparent to persons of ordinary skill in the art, each of the cells 102 represents a coverage area for providing cellular services of the cellular network 100 through communication from an enhanced node B (ENB). While the cells 102 are depicted as having non-overlapping coverage areas, persons of ordinary skill in the art will recognize that one or more of the cells 102 may have partially overlapping coverage with adjacent cells. Further, while a particular number of the cells 102 are depicted, persons of ordinary skill in the art will recognize that a larger or smaller number of the cells 102 may be included in the cellular network 100.

One or more UEs 10 may be present in each of the cells 102. Although only one UE 10 is depicted and is shown in only one cell $102_{12}$, it will be apparent to one of skill in the art that a plurality of UEs 10 might be present in each of the cells 102. An ENB 20 in each of the cells 102 performs functions similar to those of a traditional base station. That is, the ENBs 20 provide a radio link between the UEs 10 and other components in a telecommunications network. While the ENB 20 is shown only in cell $102_{12}$, it should be understood that an ENB would be present in each of the cells 102. Also, radio links other than the ENBs 20 could be used. A central control 110 oversees the wireless data transmissions within the cells 102 by providing centralized management and coordination for the cells 102 and their corresponding ENBs 20.

In the present disclosure, the cellular systems or cells 102 are described as engaged in certain activities, such as transmitting signals; however, as will be readily apparent to one skilled in the art, these activities would in fact be conducted by components comprising the cells. As an example, FIG. 2 depicts a more detailed view of the cell $102_{12}$. The ENB 20 in cell $102_{12}$ can promote communication via a transmitter 27, a receiver 29, and/or other well known equipment. Similar equipment might be present in the other cells 102. A plurality of UEs 10 are present in the cell $102_{12}$, as might be the case in the other cells 102.

The transmission of an MBMS in one or more of the cells 102 can include two components, a multicast control channel (MCCH) and a multicast traffic channel (MTCH). The MTCH delivers the actual content of the MBMS while the MCCH delivers control information related to the MBMS. The MCCH might include key control information that specifies how the content in the MTCH is to be delivered. Configuration information for the MCCH might be transmitted in a broadcast control channel (BCCH). Each of the cells 102 might transmit information over a BCCH to provide the UEs 10 with information about the MBMSs available in the cells 102 and with other information. When one of the UEs 10 powers up, it can receive the BCCH, read the MCCH configuration contained in the BCCH, and determine from the MCCH control information how to receive one or more MTCHs.

The MCCH control information may be divided into two portions: master control information and service control information. The master control information can also be referred to as primary MCCH (P-MCCH) information and the service control information can also be referred to as secondary MCCH (S-MCCH) information. The S-MCCH information can include information about how an MTCH can be received. The P-MCCH information can directly include the S-MCCH information or can include a pointer to a location where the S-MCCH information can be retrieved.

The S-MCCH information may include control information for one or more MTCH transmissions. This might include scheduling information for one or more MTCHs, modulation and coding information for one or more MTCHs, and SFN-related parameters. Since multiple MTCHs might be transmitted by a single ENB 20, and a different set of S-MCCH information might be needed for each MTCH, multiple sets of S-MCCH information might be associated with the BCCH transmitted by the single ENB 20.

The MTCH and the MCCH are logical, upper layer channels. The lower layer transport channel on which the MTCH and the MCCH are carried is typically referred to as the MBMS multicast channel, the multicast transport channel, or simply the MCH, in the MBSFN case (multi-cell operation).

Figure 3:
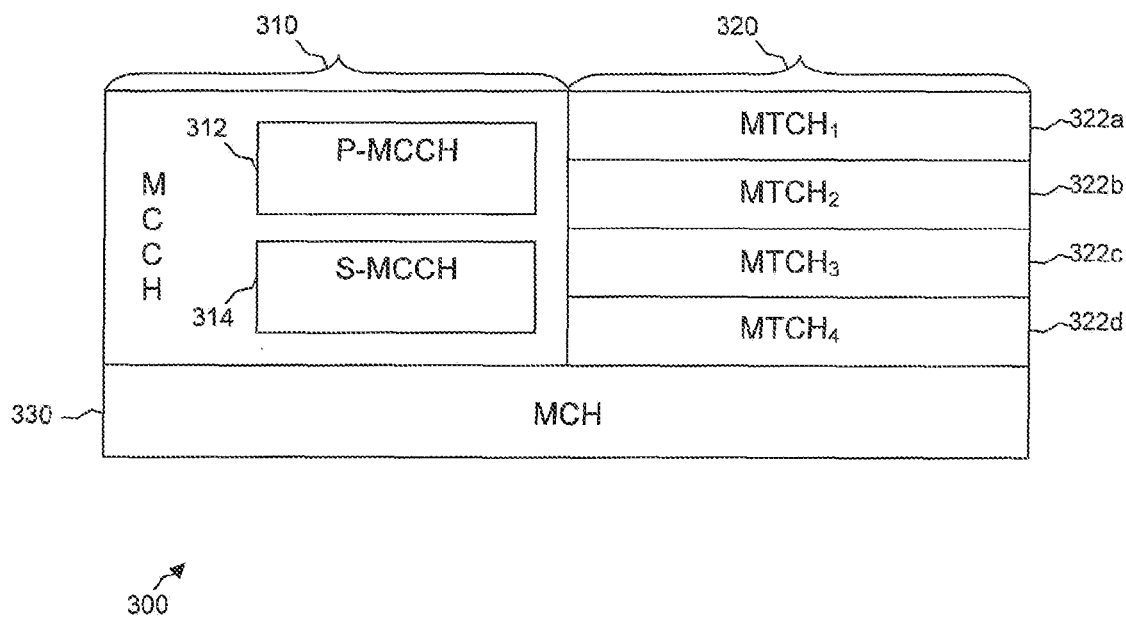
FIG. 3 is a diagram of a structure for a multimedia broadcast multicast service transmission operable for some of the various embodiments of the disclosure.

FIG. 3 illustrates a structure of an MBMS transmission 300. The transmission 300 includes an MCCH portion 310 and an MTCH portion 320. The MCCH 310 and the MTCH 320 are transported on an MCH layer 330. The MCCH 310 includes a P-MCCH portion 312 and an S-MCCH portion 314. The MTCH portion 320 includes a plurality of individual MTCHs 322, each corresponding to a different MBMS. While four MTCHs 322 are shown, a larger or smaller number of MTCHs 322 could be present. Also, while the MCCH portion 310 and the MTCH portion 320 are shown being carried on the same MCH layer 330, in some cases, the MCCH portion 310 and the MTCH portion 320 could be carried on different MCHs.

Figure 4:
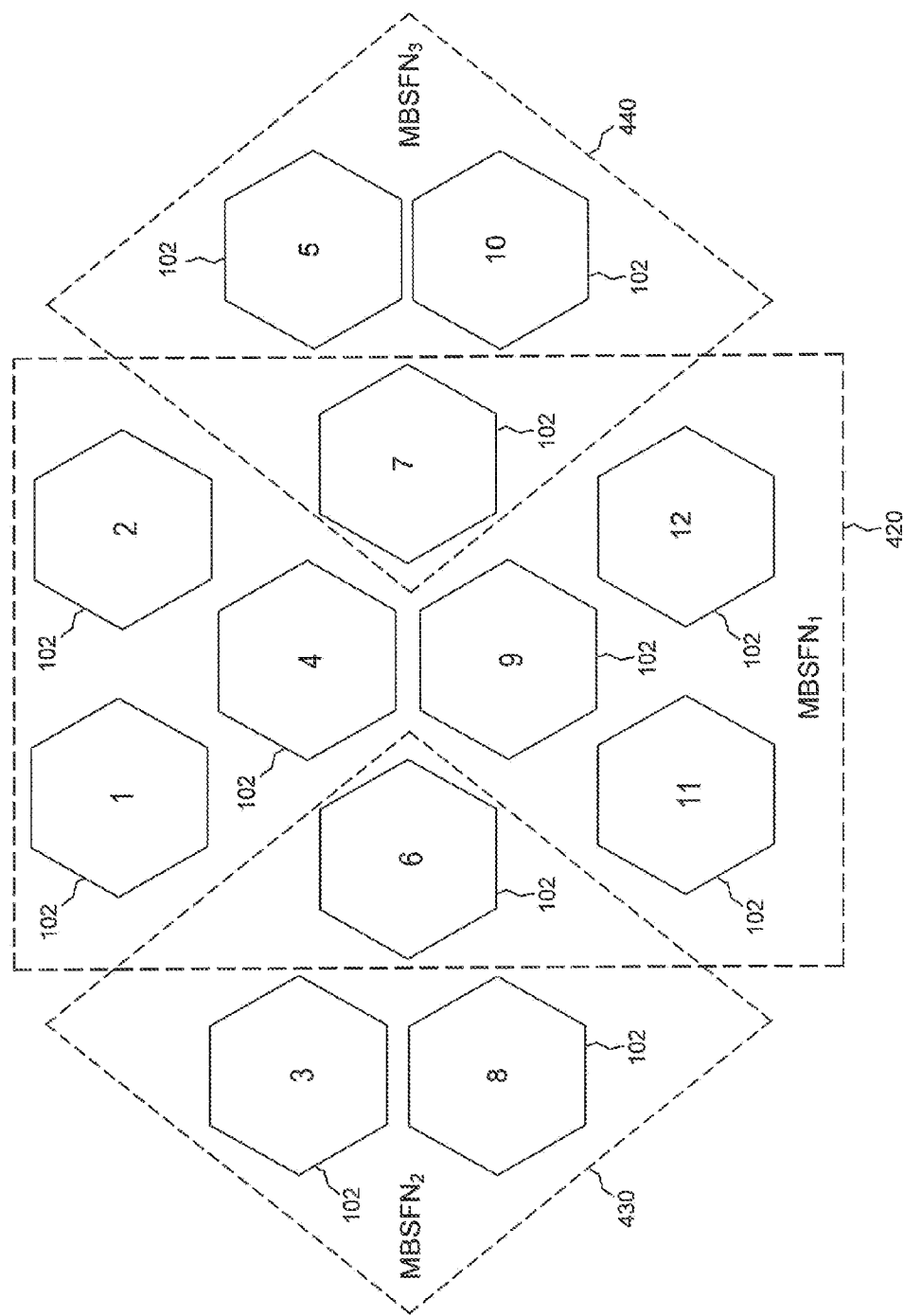
FIG. 4 is a diagram of a plurality of multicast/broadcast single frequency networks operable for some of the various embodiments of the disclosure.

FIG. 4 illustrates a plurality of MBSFNs in which a broadcast and/or multicast of a plurality of MBMS transmissions, such as the MBMS transmission 300, might occur. A first MBSFN 420 includes cells $102_1$, $102_2$, $102_4$, $102_6$, $102_7$, $102_9$, $102_{11}$, and $102_{12}$. A second MBSFN 430 includes cells $102_3$, $102_6$, and $102_8$. A third MBSFN 440 includes cells $102_5$, $102_7$, and $102_{10}$. That is, a broadcast and/or multicast of a first MBMS can be assumed to be occurring in the first MBSFN 420, a broadcast and/or multicast of a second MBMS can be assumed to be occurring in the second MBSFN 430, and a broadcast and/or multicast of a third MBMS can be assumed to be occurring in the third MBSFN 440.

Cell $102_6$ belongs to both the first MBSFN 420 and the second MBSFN 430, and therefore broadcasts and/or multicasts of both the first and the second MBMS can be assumed to be occurring in cell $102_6$. Cell $102_7$ belongs to both the first MBSFN 420 and the third MBSFN 440, and therefore broadcasts and/or multicasts of both the first and the third MBMS can be assumed to be occurring in cell $102_7$. Broadcasts and/or multicasts of other MBMSs could be occurring in the cells 102, and therefore other MBSFNs could be present but are not shown.

Because the size of data packets for MBMS services is dynamic, a certain level of dynamic scheduling is typically required. Data may be communicated to UEs using sub-frames which are usually 1 ms in length. These sub-frames include a scheduling portion and a data portion. In this environment, a UE needs to read the schedule of each sub-frame to determine whether the sub-frame contains any data of interest to the UE. However the MBMS traffic rate tends to be dynamic over longer periods of time, while the MBMS traffic rate may be near constant over shorter periods of time. Therefore, instead of employing 1 ms sub-frames each having scheduling overhead, the present disclosure proposes a scheduling period (SP) of varying length, which may be from a few milliseconds to several seconds long. To reduce overhead, the scheduling information for the entire scheduling period is front-loaded in a scheduling portion ahead of the data which is provided in a data portion. The UE may gain efficiencies by waking to read the schedule related to longer transmissions as compared with waking to read many schedules for shorter 1 ms sub-frames. Also, where the transmitted data is not of interest to the UE, the UE may conserve power and extend battery life by sleeping during the longer transmissions periods.

Figure 5A:
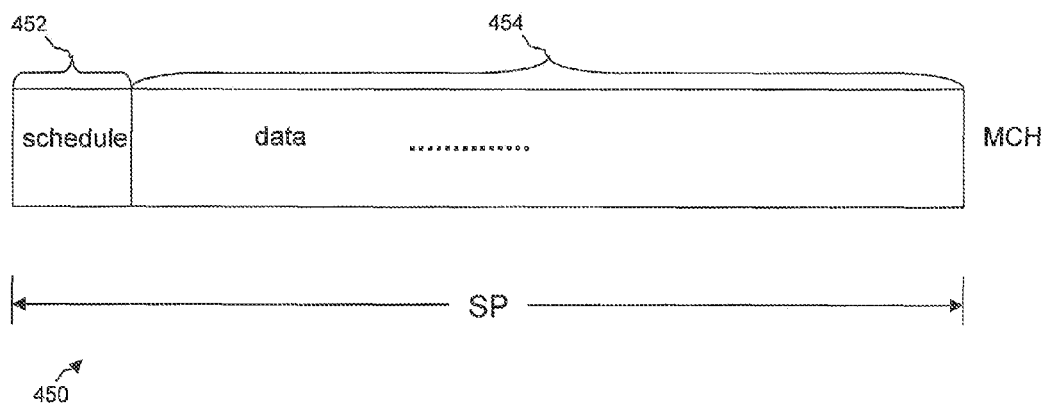
FIG. 5a is a diagram of a structure for a multicast transport channel for some of the various embodiments of the disclosure.

FIG. 5a illustrates an embodiment of a structure of an MCH 450 for a single scheduling period (SP). As mentioned above, the length of the SP may vary, for example, from more than one millisecond (ms) to several seconds. In some embodiments, the SP may be greater than about one-hundred ms and less than a few seconds. Furthermore, the SP may be dynamic over time. For example, each SP could have a different duration than the previous SP, or a 100 ms SP may be established for some period of time and then could be changed to a 500 ms SP for some duration.

The MCH 450 during the SP may comprise a scheduling portion 452 and a data portion 454. The scheduling portion 452 of the MCH 450 may include scheduling information related to the data portion 454, such as service timing including start time, end time, and duration information. The scheduling information may also contain periodicity, and resource allocation information. The scheduling portion 452 may also include additional scheduling information such as data modulation scheme and a service id associated with a particular transmitted service. The scheduling portion 452 may precede the data portion 454 and be of varying length depending on the scheduling information that needs to be provided. Thus, the lengths of both the SP and scheduling portion 452 may be variable.

The data portion 454 may follow the scheduling portion 452 and may comprise the remaining length of the MCH 450 SP. The data portion 454 may include the actual traffic content of the MBMS (multiple MTCHs), such as television programs, streaming video, and other multimedia content.

Figure 5B:
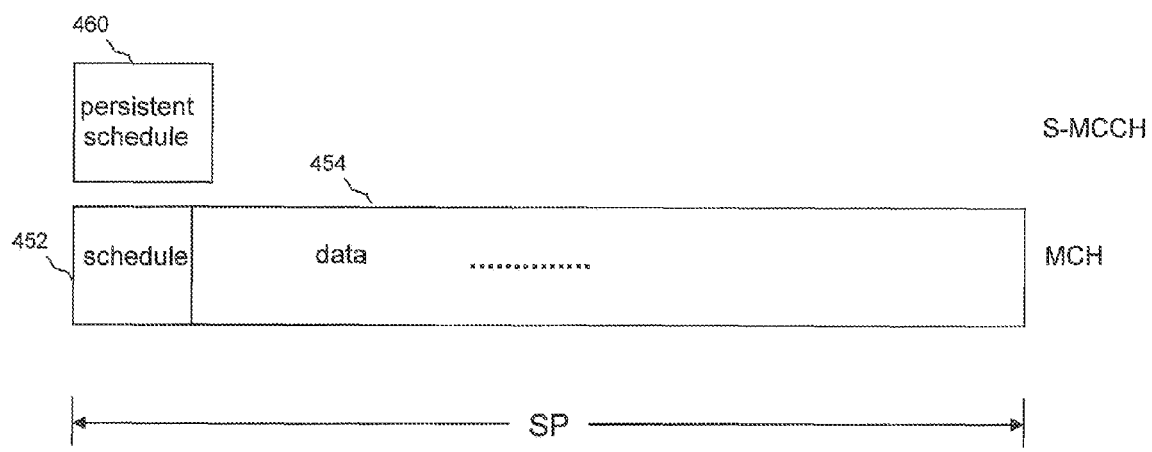
FIG. 5b is a diagram of another embodiment of a structure for a multicast transport channel according to other embodiments of the disclosure.

FIG. 5b illustrates another embodiment of a structure of the MCH 450. In MBMS services with dynamic data rates such as streaming video, dynamic scheduling information may be sent to the UEs, as described above, to improve the spectrum efficiency. However, some MBMS services may have constant or near-constant service rates, such as streaming audio, some text services such as stock market data, and other type of services having persistent data rates, all of which may be referred to herein as persistent services. These constant or near-constant rate services may not necessarily require a dynamic scheduling configuration. According to another embodiment, the present disclosure contemplates providing persistent scheduling information 460 in the S-MCCH for these constant or near-constant rate services while providing the scheduling information for the dynamic services in the scheduling portion 452 substantially as described above. As such, the persistent scheduling information 460 for any services with constant or near-constant rates is provided in the S-MCCH, which may free space for additional scheduling information in the scheduling portion 452 or more content in the data portion 454.

The scheduling decisions may be made at the central control 110 and delivered to the ENBs 20 for actual transmission. It is contemplated that the central control 110 will determine the transmission rate characteristics of each service and instruct the ENBs regarding the scheduling information, such as service timing, periodicity, and so on, and where to load the related scheduling information, either in the S-MCCH or scheduling portion of the SP in the MCH. In one embodiment, the central control may recognize that the ENBs are switching from transmitting only dynamic rate services to also include some near-constant rate services to the UEs. The central control may then reconfigure the S-MCCH in the MCH transport layer to deliver, instead of the MTCH or the P-MCCH, the scheduling information which may persist over one or a plurality of SPs.

Figure 6:
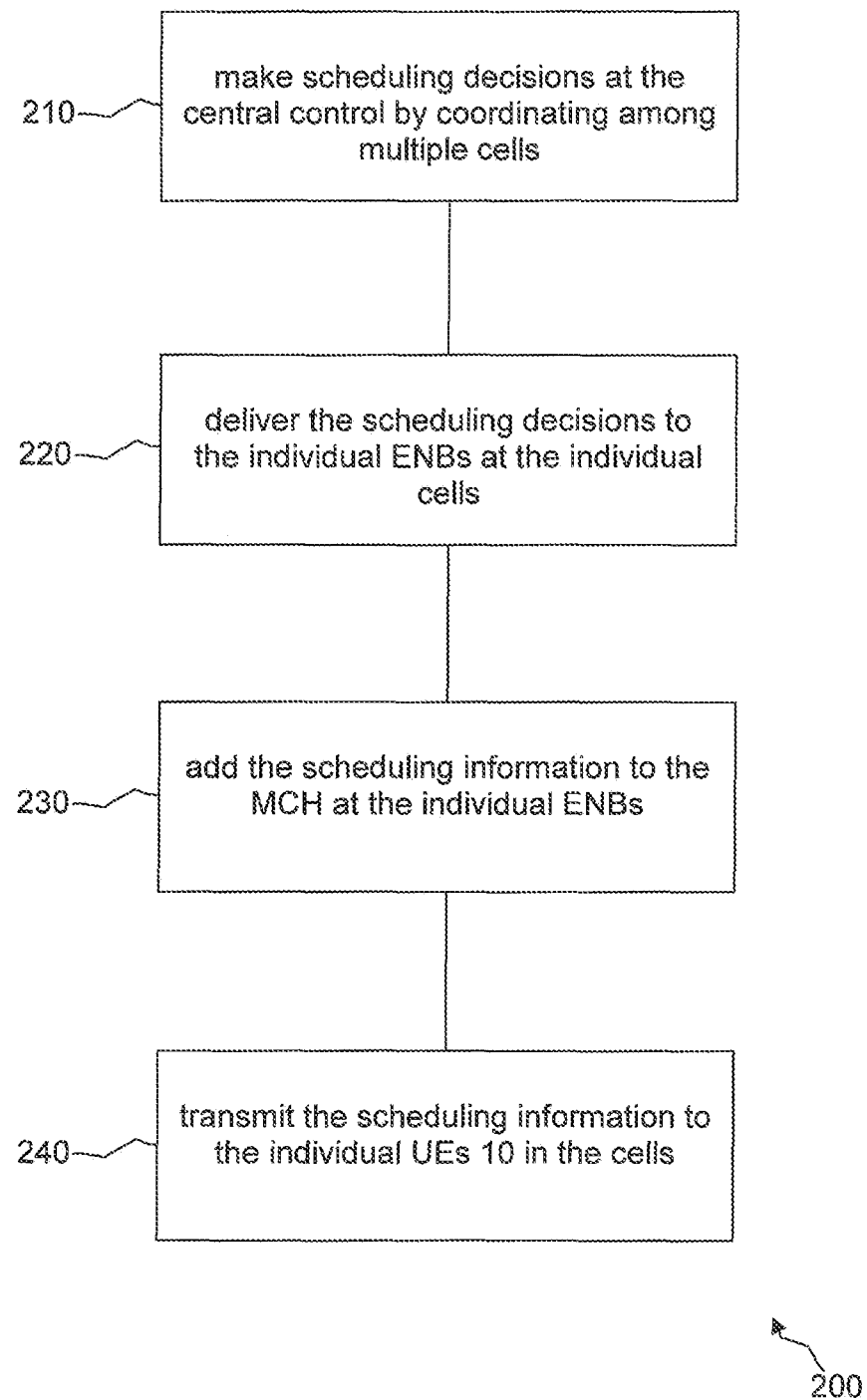
FIG. 6 is a diagram of a method for scheduling multicast traffic according to an embodiment of the disclosure.

FIG. 6 illustrates an embodiment of a method 200 that may be implemented for scheduling the transmission of MBMS to the UEs 10. In block 210, the scheduling decision for a given SP is made at the central control 110. The scheduling information among the multiple cells may be handled and coordinated at the central control 110, which is aware of the MBMS transmissions occurring in the MBSFNs over the telecommunication network. In block 220, the scheduling decisions are sent from the central control 110 to the individual ENBs 20 in the individual cells 102. In block 230, the scheduling information is added to the scheduling portion 454 of the MCH 450 at the individual ENBs 20, comprising the traffic starting time, periodicity, allocated resources, service identification or ID, and perhaps other information as well. In block 240, the scheduling information is transmitted from the ENBs 20 to the individual UEs 10 in the cells, wherein the ENBs 20 may transmit the MCH 450 comprising the scheduling information in addition to the traffic content at the start of each SP.

In the case where a single MBSFN comprise a plurality of transmitted MTCHs, the plurality of MTCHs may be mapped to the MCH transport layer. In addition, a smoother traffic transmission may be achieved by increasing the SP size in the MCH layer. The plurality of MTCHs may be multiplexed onto a single MCH transport layer, wherein different MTCHs may occupy the same sub-frame resulting in no or a reduced number of empty transfer blocks (TBs) in the sub-frame. As a result, no or a reduced number of TBs within the SP may remain vacant, which may reduce transmission overhead and padding of empty TBs. For example, four or less of the MTCHs 320 in FIG. 3 may be multiplexed over a plurality of SPs, one SP at a time. The resulting multiplexed MCH may be similar in format over a single SP to the MCH 450, comprising a scheduling portion 452 for the multiplexed data, and a multiplexed data portion 454. The multiplexed MCH may also have a different format that changes with the SP. As in the case of scheduling multiple MTCH traffic, multiplexing the MTCHs may be initiated at the central control 110. The central control 110 may specify the multiplexing decisions/ options such as deciding on the multiplexing configuration for a plurality of MTCHs, as well as how many services and which services may be multiplexed together within an SP. The central control 110 may then send the multiplexing information to the ENBs 20, wherein the MTCHs may be transmitted to the UEs 10.

Figure 7A:
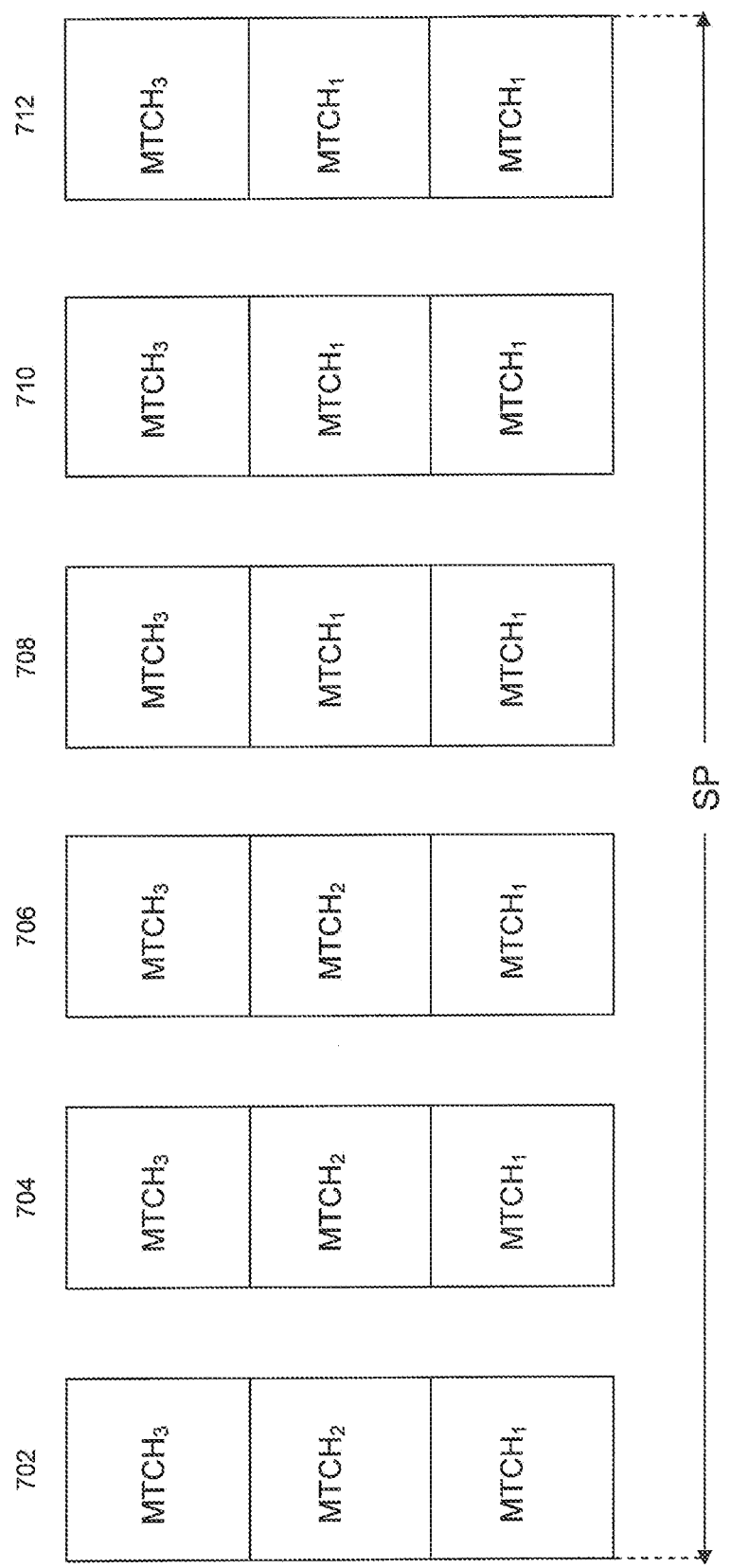
FIG. 7a is a diagram of a structure for multiplexed multimedia broadcast multicast service transmissions for some of the various embodiments of the disclosure.

FIG. 7a illustrates an embodiment 700 of multiplexed data in an SP of an MCH. Specifically, three of the four MTCHs 320 in FIG. 3, $MTCH_1$, $MTCH_2$, and $MTCH_3$ may be multiplexed onto the MCH using a frequency-first multiplexing scheme. In the frequency-first multiplexing scheme 700, the service traffic from the three MTCHs may be mapped onto the sub-frames of the SP, 702, 704, 706, 708, 710, and 712, wherein each sub-frame in the SP may comprise a plurality of TBs comprising traffic from all three MTCHs. When the traffic from one MTCH is completely transmitted, the sub-frames may then comprise traffic from the remaining MTCHs in the MBSFN. For instance, the first three sub-frames of the SP, 702, 704, and 706 may comprise the entire $MTCH_2$ traffic as well as some of the $MTCH_1$ and $MTCH_3$ traffic. The remaining three sub-frames, 708, 710, and 712 may comprise the remaining traffic for the $MTCH_1$ and the $MTCH_3$ but not for the $MTCH_2$, since the entire $MTCH_2$ traffic is already transmitted in the first three sub-frames. Since service data for all three MTCHs are transmitted from the start of the first SP, the frequency-first scheme 700 may reduce time delays in all services transmitted at the same time.

Figure 7B:
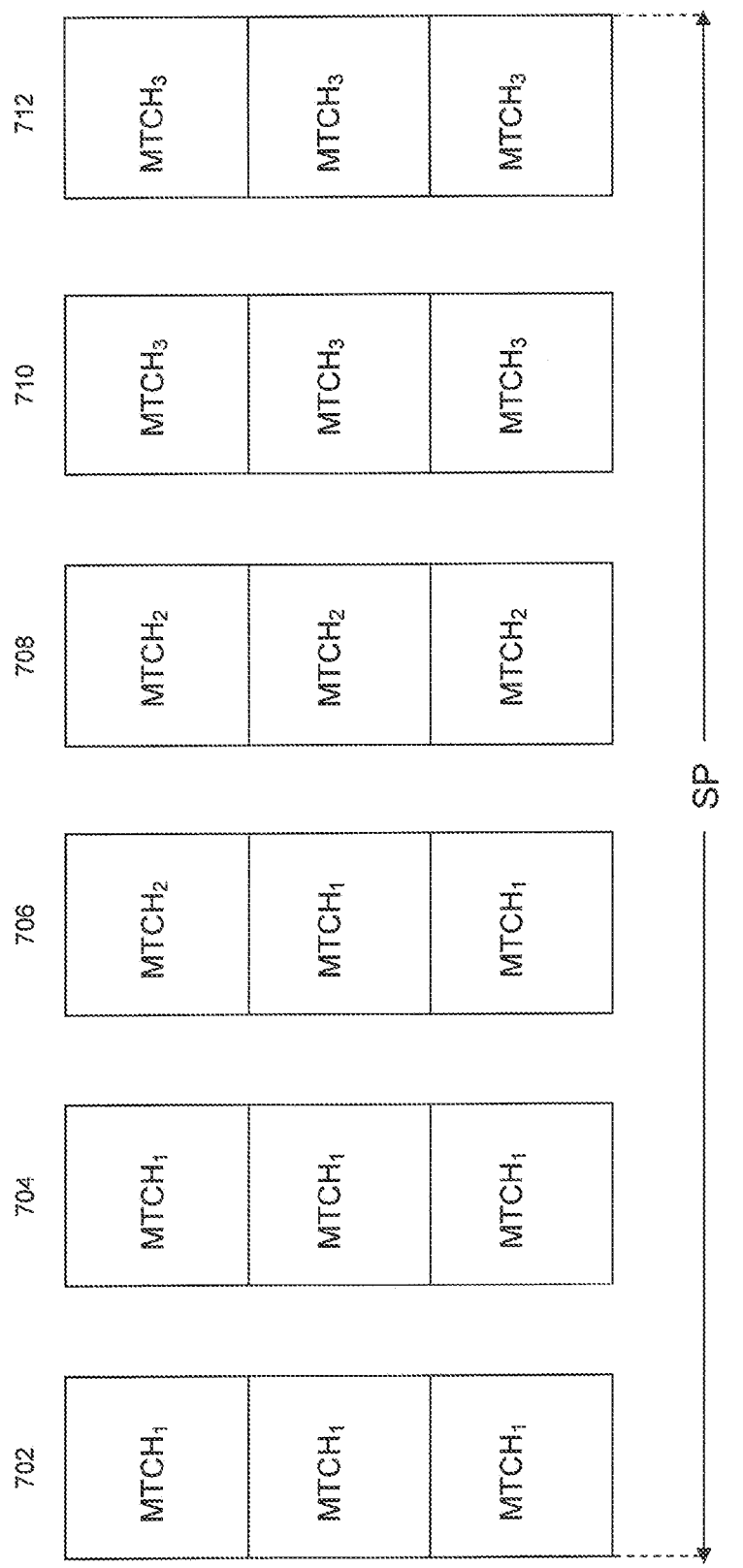
FIG. 7b is a diagram of another structure for multiplexed multimedia broadcast multicast service transmissions for some of the various embodiments of the disclosure.

FIG. 7b illustrates another embodiment 720 of multiplexed data in an MCH, wherein the three MTCHs 320 are multiplexed using a time-first multiplexing scheme. In the time-first multiplexing scheme 720, the three MTCHs services may be mapped onto the SP sub-frames one MTCH after another in a sequential manner. For example, the $MTCH_1$ may be first mapped onto the first sub-frames of the SP, 702, 704, and parts of 706, until the first sub-frames 702, 704, 706 comprise the entire $MTCH_1$ service data. In the same manner, MTCH2 and MTCH3 may be mapped one at a time onto the following sub-frames of the SP. As a result, the time-first multiplexing scheme 720 may cause transmission delays for $MTCH_2$ and $MTCH_3$ in comparison to the corresponding $MTCH_2$ and $MTCH_3$ transmission delays of the frequency-first multiplexing scheme 700. However, using the time-first multiplexing scheme 720 the introduced transmission delays may be less significant considering that the MBMS is not primarily an interactive service and hence is not as delay sensitive.

In the time-first multiplexing scheme 720, a sub-frame may comprise traffic from two MTCHs during the transition from one MTCH to another MTCH in order to avoid or reduce the number of empty TBs in the transitional sub-frame. For instance, the sub-frame 706 may comprise $MTCH_1$ traffic as well as $MTCH_2$ traffic, wherein the time-first multiplexing scheme 720 may transition from transmitting the last remaining $MTCH_1$ traffic data to transmitting the first data of the $MTCH_2$ traffic. In other embodiments, a sub-frame may comprise traffic from a plurality of MTCHs, wherein the sub-frame size may be at least large enough to accommodate the entire traffic for at least one of the MTCHs. For instance, the sub-frame 706 may comprise the last of the $MTCH_1$ data and the entire $MTCH_2$ traffic if the entire $MTCH_2$ traffic is smaller than the remaining size of the sub-frame 706. Moreover, if the entire $MTCH_2$ traffic is sufficiently smaller than the remaining size of the sub-frame 706, the sub-frame 706 may additionally comprise the first data of the $MTCH_3$ traffic.

In order to receive the MTCHs service data, the UEs may need to be in wake-up mode, i.e. turned on. In the case of the frequency-first multiplexing scheme 700, the UE 10a, for example, that is interested in receiving only $MTCH_1$ needs to be in wake-up mode throughout the entire SP duration. Since the $MTCH_1$ traffic is transmitted along the entire sub-frames of the SP, the UE 10a needs to be in wake-up mode throughout the entire transmission period. On the other hand, in the time-first multiplexing scheme 720, the UE interested in receiving only $MTCH_1$ may be in wake-up mode during the transmission of the first sub-frames, 702, 704, and 706 of the SP that comprise the entire $MTCH_1$ traffic. When no $MTCH_1$ traffic remains in the transmitted SP sub-frames, the UE may be turned off. Similarly, the UE 10b that may be interested in receiving only $MTCH_2$ may be turned on at the instance when the first sub-frame in the SP comprising $MTCH_2$ traffic, i.e. sub-frame 706, is being transmitted.

Since traffic scheduling as well as multiplexing may be performed at the start of the SP, the UEs may utilize efficient discontinuous reception (DRx) behavior to save battery life and power consumption. Efficient DRx behavior may be achieved when the UEs are turned on during a small portion of the SP wherein the traffic data is transmitted from the ENBs. Instead of remaining in wake-up mode during the entire duration of the SP, the UEs are turned off during the remaining time period of the SP.

Figure 8:
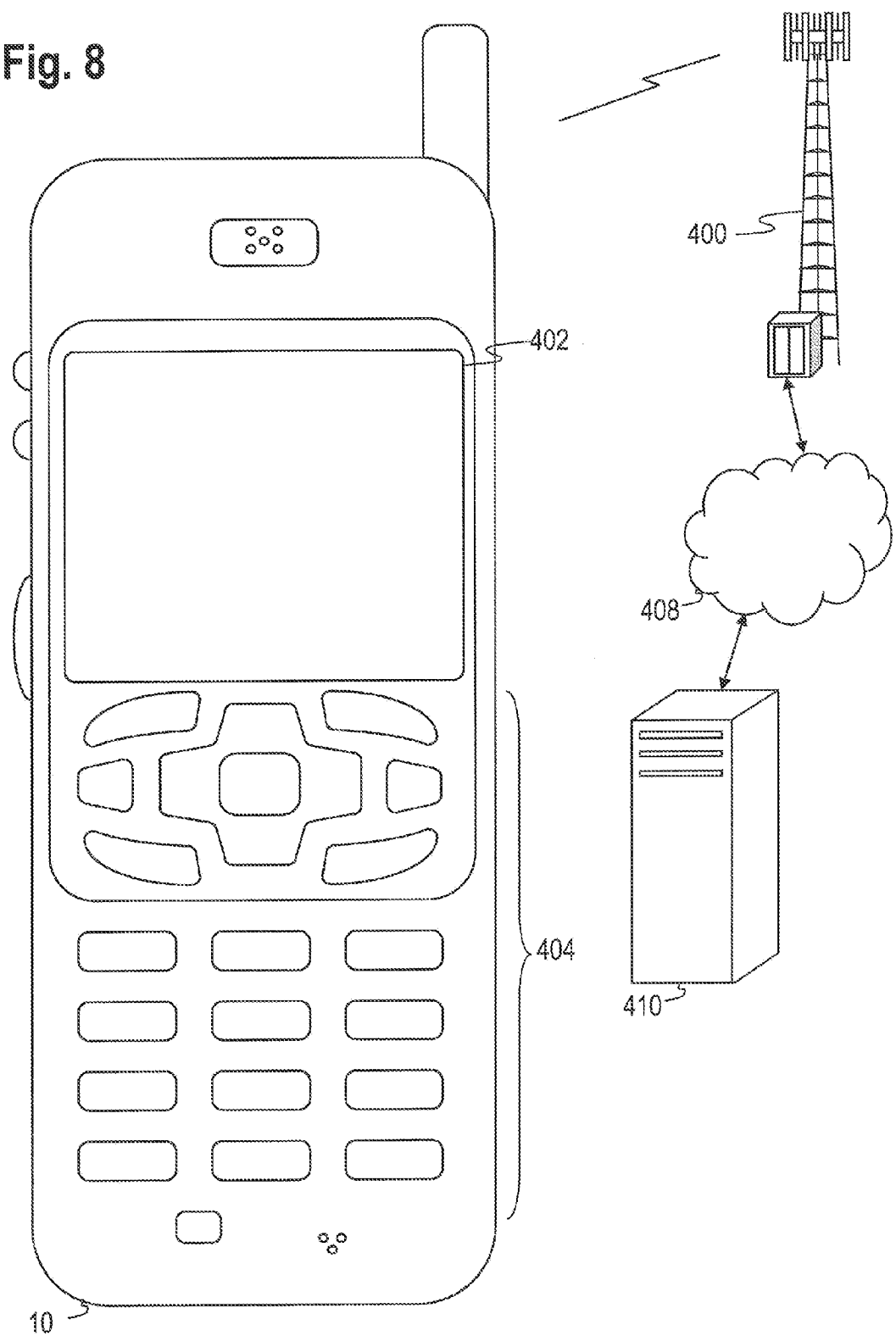
FIG. 8 is a diagram of a wireless communications system including user equipment operable for some of the various embodiments of the disclosure.

FIG. 8 illustrates a wireless communications system including an embodiment of the UE 10. The UE 10 is operable for implementing aspects of the disclosure, but the disclosure should not be limited to these implementations. Though illustrated as a mobile phone, the UE 10 may take various forms including a wireless handset, a pager, a personal digital assistant (PDA), a portable computer, a tablet computer, or a laptop computer. Many suitable devices combine some or all of these functions. In some embodiments of the disclosure, the UE 10 is not a general purpose computing device like a portable, laptop or tablet computer, but rather is a special-purpose communications device such as a mobile phone, a wireless handset, a pager, a PDA, or a telecommunications device installed in a vehicle. In another embodiment, the UE 10 may be a portable, laptop or other computing device. The UE 10 may support specialized activities such as gaming, inventory control, job control, and/or task management functions, and so on.

The UE 10 includes a display 402. The UE 10 also includes a touch-sensitive surface, a keyboard or other input keys generally referred as 404 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UE 10 may present options for the user to select, controls for the user to actuate, and/or cursors or other indicators for the user to direct.

The UE 10 may further accept data entry from the user, including numbers to dial or various parameter values for configuring the operation of the UE 10. The UE 10 may further execute one or more software or firmware applications in response to user commands. These applications may configure the UE 10 to perform various customized functions in response to user interaction. Additionally, the UE 10 may be programmed and/or configured over-the-air, for example from a wireless base station, a wireless access point, or a peer UE 10.

Among the various applications executable by the UE 10 are a web browser, which enables the display 402 to show a web page. The web page may be obtained via wireless communications with a wireless network access node, a cell tower, a peer UE 10, or any other wireless communication network or system 400. The network 400 is coupled to a wired network 408, such as the Internet. Via the wireless link and the wired network, the UE 10 has access to information on various servers, such as a server 410. The server 410 may provide content that may be shown on the display 402. Alternately, the UE 10 may access the network 400 through a peer UE 10 acting as an intermediary, in a relay type or hop type of connection.

Figure 9:
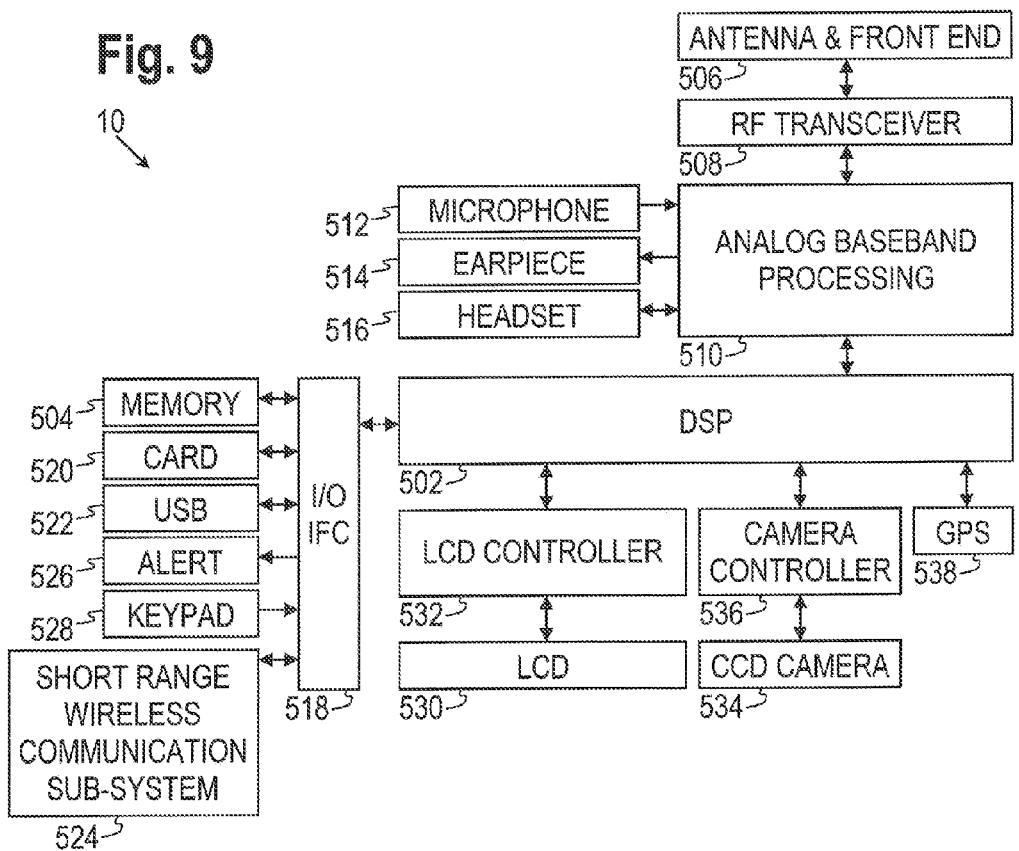
FIG. 9 is a block diagram of user equipment operable for some of the various embodiments of the disclosure.

FIG. 9 shows a block diagram of the UE 10. While a variety of known components of UEs 10 are depicted, in an embodiment a subset of the listed components and/or additional components not listed may be included in the UE 10. The UE 10 includes a digital signal processor (DSP) 502 and a memory 504. As shown, the UE 10 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, a short range wireless communication sub-system 524, an alert 526, a keypad 528, a liquid crystal display (LCD), which may include a touch sensitive surface 530, an LCD controller 532, a charge-coupled device (CCD) camera 534, a camera controller 536, and a global positioning system (GPS) sensor 538. In an embodiment, the UE 10 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the UE 10 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the UE 10 to send and receive information from a cellular network or some other available wireless communications network or from a peer UE 10. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF Transceiver 508, portions of the Antenna and Front End 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset 516 and outputs to the earpiece 514 and the headset 516. To that end, the analog baseband processing unit 510 may have ports for connecting to the built-in microphone 512 and the earpiece speaker 514 that enable the UE 10 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the short range wireless communication sub-system 524. The USB interface 522 may be used to charge the UE 10 and may also enable the UE 10 to function as a peripheral device to exchange information with a personal computer or other computer system. The short range wireless communication sub-system 524 may include an infrared port, a Bluetooth interface, an IEEE 802.11 compliant wireless interface, or any other short range wireless communication sub-system, which may enable the UE 10 to communicate wirelessly with other nearby mobile devices and/or wireless base stations.

The input/output interface 518 may further connect the DSP 502 to the alert 526 that, when triggered, causes the UE 10 to provide a notice to the user, for example, by ringing, playing a melody, or vibrating. The alert 526 may serve as a mechanism for alerting the user to any of various events such as an incoming call, a new text message, and an appointment reminder by silently vibrating, or by playing a specific pre-assigned melody for a particular caller.

The keypad 528 couples to the DSP 502 via the interface 518 to provide one mechanism for the user to make selections, enter information, and otherwise provide input to the UE 10. The keyboard 528 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 530, which may include touch screen capability and also display text and/or graphics to the user. The LCD controller 532 couples the DSP 502 to the LCD 530.

The CCD camera 534, if equipped, enables the UE 10 to take digital pictures. The DSP 502 communicates with the CCD camera 534 via the camera controller 536. In another embodiment, a camera operating according to a technology other than Charge Coupled Device cameras may be employed. The GPS sensor 538 is coupled to the DSP 502 to decode global positioning system signals, thereby enabling the UE 10 to determine its position. Various other peripherals may also be included to provide additional functions, e.g., radio and television reception.

Figure 10:
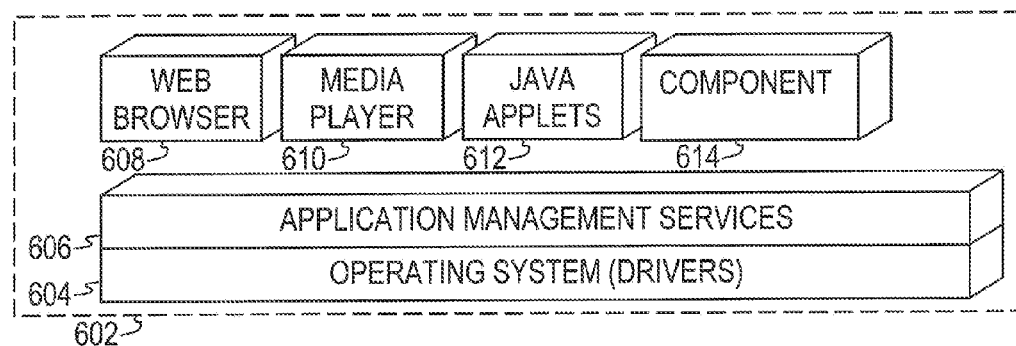
FIG. 10 is a diagram of a software environment that may be implemented on user equipment operable for some of the various embodiments of the disclosure.

FIG. 10 illustrates a software environment 602 that may be implemented by the DSP 502. The DSP 502 executes operating system drivers 604 that provide a platform from which the rest of the software operates. The operating system drivers 604 provide drivers for the wireless device hardware with standardized interfaces that are accessible to application software. The operating system drivers 604 include application management services ("AMS") 606 that transfer control between applications running on the UE 10. Also shown in FIG. 10 are a web browser application 608, a media player application 610, and Java applets 612. The web browser application 608 configures the UE 10 to operate as a web browser, allowing a user to enter information into forms and select links to retrieve and view web pages. The media player application 610 configures the UE 10 to retrieve and play audio or audiovisual media. The Java applets 612 configure the UE 10 to provide games, utilities, and other functionality. A component 614 might provide functionality related to MBSFN data scheduling and handling.

Figure 11:
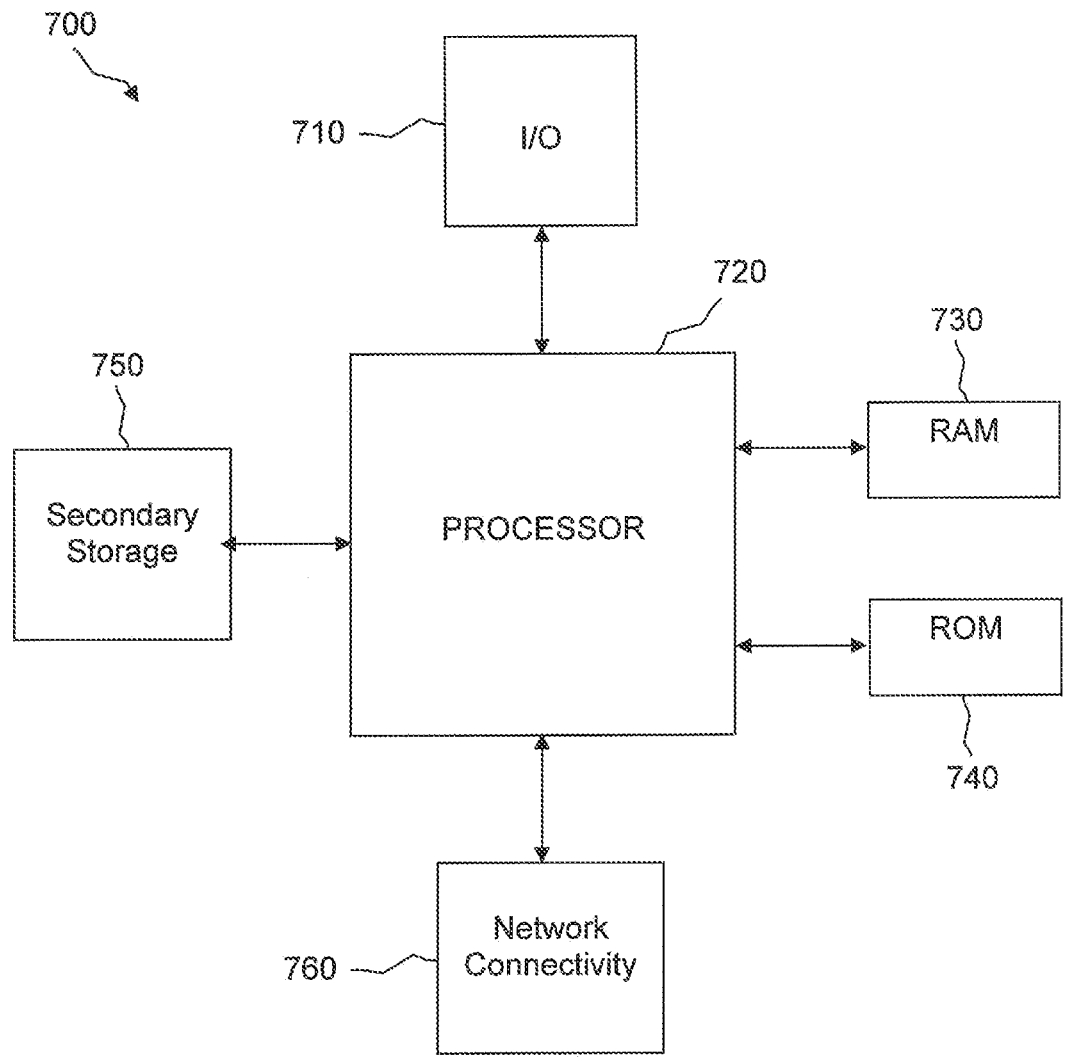
FIG. 11 is an illustrative general purpose computer system suitable for some of the various embodiments of the disclosure.

The UEs 10, ENBs 20, and central control 110 of FIG. 1 and other components that might be associated with the cells 102 may include any general-purpose computer with sufficient processing power, memory resources, and network throughput capability to handle the necessary workload placed upon it. FIG. 11 illustrates a typical, general-purpose computer system 700 that may be suitable for implementing one or more embodiments disclosed herein. The computer system 700 includes a processor 720 (which may be referred to as a central processor unit or CPU) that is in communication with memory devices including secondary storage 750, read only memory (ROM) 740, random access memory (RAM) 730, input/output (I/O) devices 700, and network connectivity devices 760. The processor may be implemented as one or more CPU chips.

The secondary storage 750 is typically comprised of one or more disk drives or tape drives and is used for non-volatile storage of data and as an over-flow data storage device if RAM 730 is not large enough to hold all working data. Secondary storage 750 may be used to store programs which are loaded into RAM 730 when such programs are selected for execution. The ROM 740 is used to store instructions and perhaps data which are read during program execution. ROM 740 is a non-volatile memory device which typically has a small memory capacity relative to the larger memory capacity of secondary storage. The RAM 730 is used to store volatile data and perhaps to store instructions. Access to both ROM 740 and RAM 730 is typically faster than to secondary storage 750.

I/O devices 700 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 760 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 760 devices may enable the processor 720 to communicate with an Internet or one or more intranets. With such a network connection, it is contemplated that the processor 720 might receive information from the network, or might output information to the network in the course of performing the above-described method steps. Such information, which is often represented as a sequence of instructions to be executed using processor 720, may be received from and outputted to the network, for example, in the form of a computer data signal embodied in a carrier wave.

Such information, which may include data or instructions to be executed using processor 720 for example, may be received from and outputted to the network, for example, in the form of a computer data baseband signal or signal embodied in a carrier wave. The baseband signal or signal embodied in the carrier wave generated by the network connectivity 760 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 720 executes instructions, codes, computer programs, scripts which it accesses from hard disk, floppy disk, optical disk (these various disk-based systems may all be considered secondary storage 750), ROM 740, RAM 730, or the network connectivity devices 760. While only one processor 720 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for providing a plurality of multicast traffic channels (MTCHs), comprising:

determining the plurality of MTCHs that belong to a single multicast broadcast single frequency network (MSBFN);

selecting a multiplexing scheme for the plurality of MTCHs; and mapping the plurality of MTCHs according to the multiplexing scheme to a single multicast transport channel (MCH) layer over a variable scheduling period (SP), wherein traffic from the plurality of MTCHs is allocated to a plurality of transport blocks (TBs) of the SP, wherein the selected multiplexing scheme is a time-first multiplexing scheme, wherein traffic from each of the plurality of MTCHs is sequentially mapped to a plurality of sub-frames of the SP, such that all traffic from a first MTCH is mapped to the sub-frames of the SP before mapping traffic from a second MTCH to the sub-frames of the SP, and wherein at least some of the plurality of TBs of one of the sub-frames includes traffic from more than one of the MTCHs during transitioning from transmitting a last remaining content from the first MTCH to transmitting a first content from the second MTCH.

2. The method of claim 1, wherein a central control determines a length of the SP, determines which of the plurality of MTCHs belong to the MSBFN, and selects the multiplexing scheme for the plurality of MTCHs.

3. The method of claim 1, wherein a SP length is dynamic over time and assigned by a central control.

4. A user equipment, comprising:

a processor configured to receive a multicast broadcast single frequency network (MSBFN) transmission, the MSBFN transmission comprising a plurality of multiplexed MTCHs mapped according to a time-first multiplexing scheme to a single multicast transport channel (MCH) over a variable scheduling period (SP), wherein traffic from the plurality of multiplexed MTCHs is allocated to a plurality of transport blocks (TBs) of the SP, wherein traffic from each of the plurality of MTCHs is sequentially mapped to a plurality of sub-frames of the SP, such that all traffic from a first MTCH is mapped to the sub-frames of the SP before mapping traffic from a second MTCH to the sub-frames of the SP, wherein at least some of the plurality of TBs of one of the sub-frames includes traffic from more than one of the MTCHs during transitioning from transmitting a last remaining content from the first MTCH to transmitting a first content from the second MTCH.

5. The user equipment of claim 1, wherein a SP length is dynamic over time and assigned by a central control.

* * * * *